Figure 1:
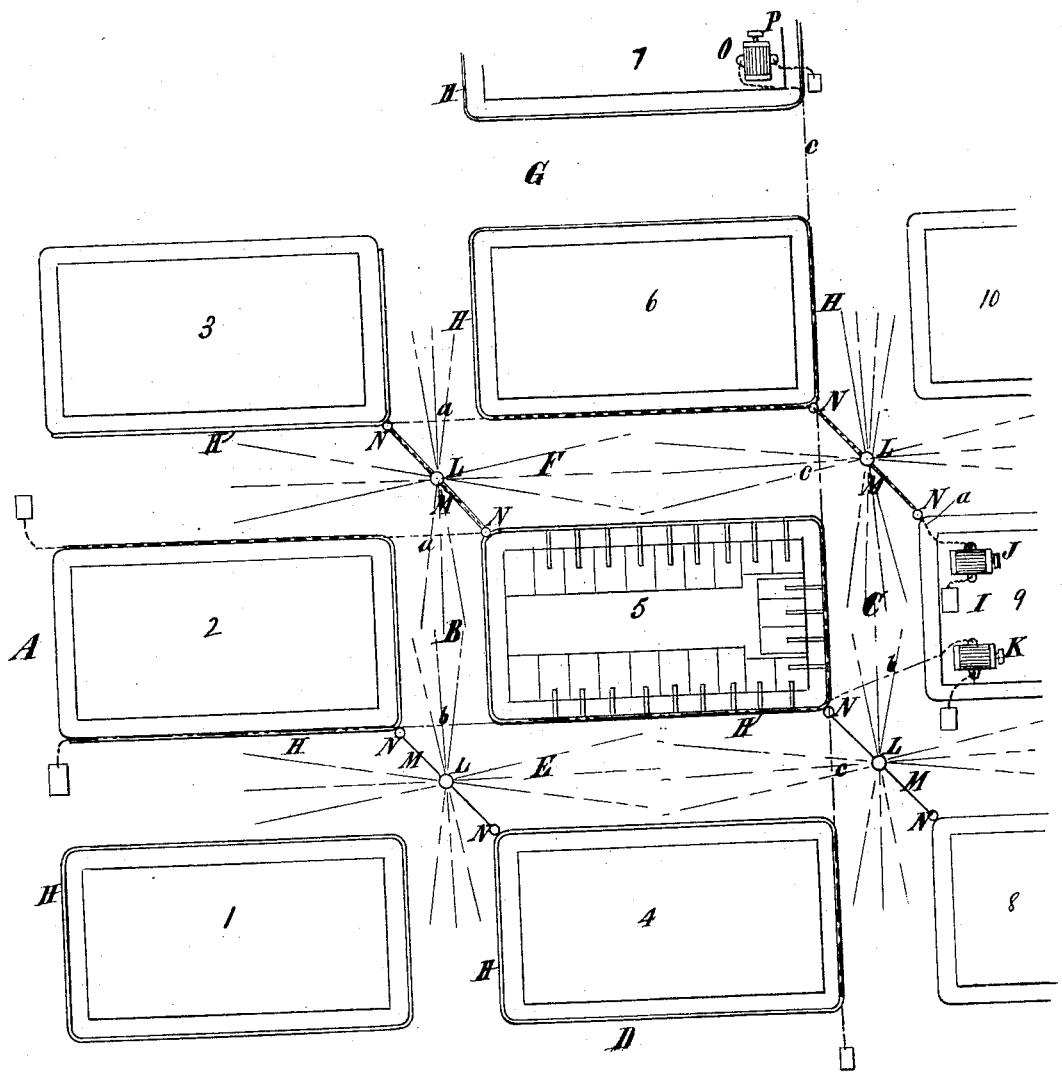

(No Model.) 2 Sheets—Sheet 2.
C. A. HUSSEY.
Conduit for Electric Conductors.
No. 242,827. Patented June 14, 1881.
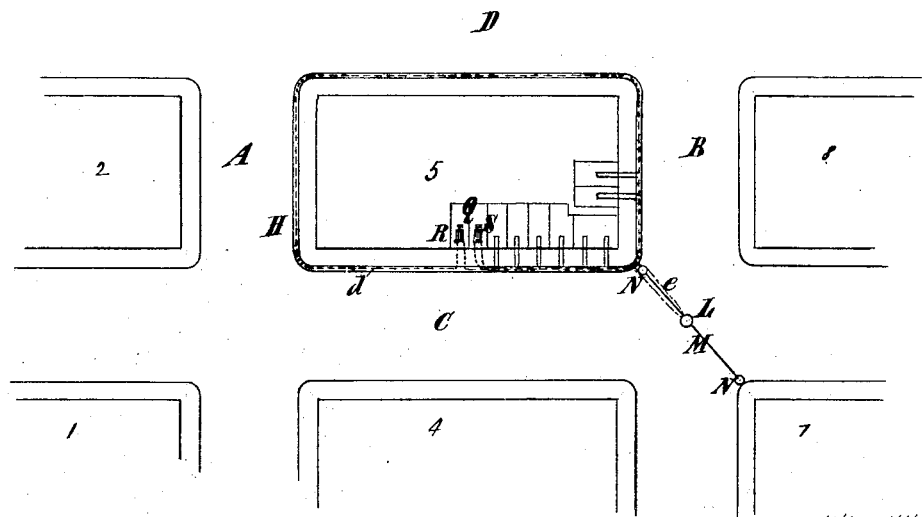
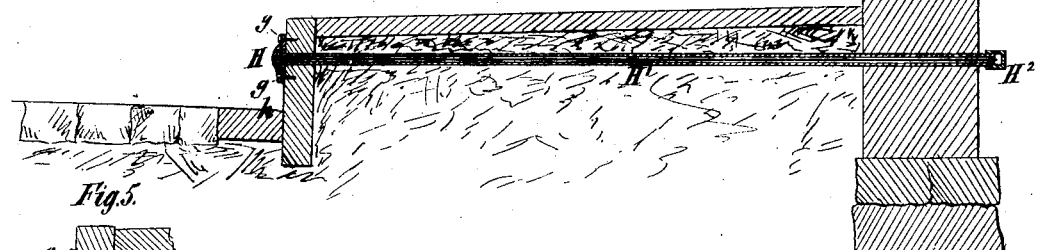
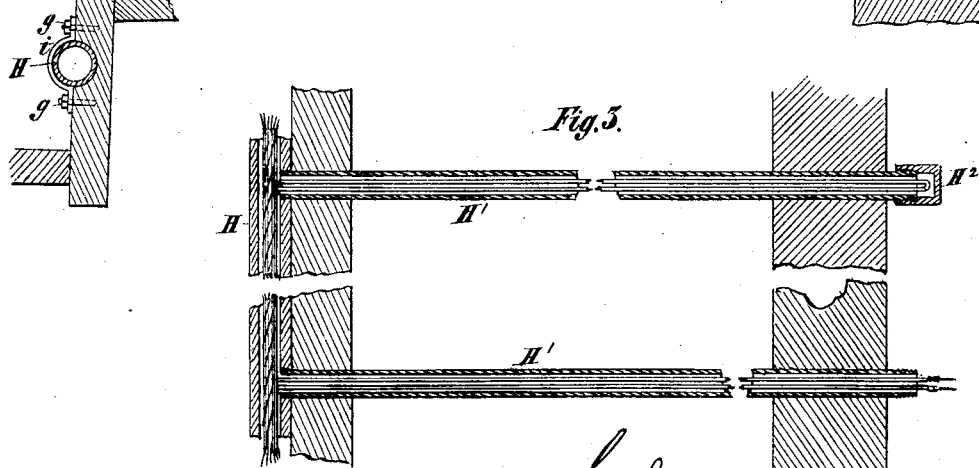
Witnesses
J. Keane
Fred. Haynes
Inventor
Charles A. Hussey
By his Attorney
Edwin H. Brown

UNITED STATES PATENT OFFICE.

CHARLES A. HUSSEY, OF NEW YORK, N. Y., ASSIGNOR TO HUSSEY ELECTRIC COMPANY, OF SAME PLACE.

CONDUIT FOR ELECTRIC CONDUCTORS.

SPECIFICATION forming part of Letters Patent No. 242,827, dated June 14, 1881.

Application filed April 15, 1881. (No model.)

*To all whom it may concern:*

Be it known that I, CHARLES A. HUSSEY, of New York, in the county and State of New York, have invented certain new and useful Improvements in Conduits for Electric Conductors, of which the following is a specification.

My improvements consist in the combination, with the curb of a sidewalk, of a conduit affixed thereto, receiving and protecting wires employed for conveying electricity from one place to another.

In the accompanying drawings, Figure 1 illustrates a number of blocks of houses and other buildings and streets, having wires for electric street-lamps and houses conducted to them, according to my improvements. Fig. 2 is a similar view representing a modification of my improvements. Fig. 3 is a horizontal section of a sidewalk, the curb thereof, a conduit for wires applied to the curb, and branch conduits leading to two houses, all on a larger scale. Fig. 4 is a transverse vertical section of a sidewalk, its curb, and said conduits, all on a slightly smaller scale; and Fig. 5 is a transverse section of a curb and conduit on a larger scale.

Similar letters of reference designate corresponding parts in all the figures.

Referring, first, to Fig. 1, A, B, and C designate three parallel streets, and D, E, F, and G designate four cross-streets. 1, 2, 3, 4, 5, 6, 7, 8, 9, and 10 designate blocks of houses and other buildings. Around the face of the curb of each block extends a conduit, H, (see particularly Figs. 4 and 5,) through which pass wires from generators of electricity.

On the block 9 is a station or office, I, where generators of electricity, here shown as consisting of dynamo-electric machines, are arranged. Preferably there is a dynamo-electric machine, J, for supplying electricity for the street-lamps, and another dynamo-electric machine, K, for supplying electricity for the lamps in houses and other buildings. I will first describe the street-lamps and the course of the wires whereby electricity is transmitted to them.

The street-lamps are lettered L, and are suspended or otherwise supported from arches or cross-pieces M, elevated on poles N, and extending obliquely across from one block to another at the intersection of two streets. The wire *a*, whereby electricity is supplied to them, passes from the dynamo-electric machine J to the nearest street-lamp L, thence along the conduit H of the face of block 6, which is on street F, to the end and under the surface of street F, to the next lamp L. Thence it passes to the corner of block 5, under the surface of street B, again to the conduit H of the face of block 2, which is on street F. In this way it may extend for any desired distance, and thence to the ground beyond the last lamp. The wire *b*, whereby electricity is supplied to the lamps in the various houses and buildings, extends from the dynamo-electric machine K to the conduit H of the face of block 5, which is on street E. Thence it extends across street B, below the surface, to the conduit H of that face of the block 2 which is on street E, and thence to the ground. This wire may extend any length along a street and thence to the ground, or it may cross the street and return through the conduits H on the adjacent faces of the opposite blocks to the dynamo-electric machine K.

O designates a station or office on block 7, where there is a dynamo-electric machine, P, serving as a generator of electricity for the lamps in houses and other buildings on those faces of blocks 6, 5, and 4 which are on street C. A wire, *c*, extends from this dynamo-electric machine, across and under the surface of street G, to that conduit H which extends along the face of block 6, which is on street C; thence it extends through this conduit to and across street F under its surface; thence it enters and extends through the conduit H, which is on the face of block 5 on street C, to and across street E, below its surface; thence it enters and passes through the conduit H of the face of the block 4, which is on street C, and thence to the ground. This wire may thus extend any desired distance along street C and pass to the ground; or it may cross the street and extend back to the dynamo-electric machine P, along the conduits H of adjacent faces of the opposite blocks, 8, 9, and 10.

The entire or any suitable portion of the streets of a city may thus be supplied with electricity for street-lamps, and lamps in the houses and other buildings, and the wires may run in each direction from the dynamo-electric machines, or, in other words, both up and down the street. It is not necessary, when the street-lamps are arranged as described, that they should be supplied with electricity by wires extending along but one series of parallel streets, as the lamps then will shed light down both series of streets.

It is desirable that separate dynamo-electric machines should be employed for supplying electricity to the street-lamps and the lamps in houses and other buildings, so that neither system of lamps will affect the other. The street-lamps may be voltaic-arc lamps, and the lamps in the houses and other buildings may be incandescent lamps provided with carbons or other suitable devices in vacuo. Preferably extra or spare dynamo-electric machines will be kept in each station or office, so that in case anything happens to one in use it may be immediately replaced by another and the light continued without material interruption. Of course the wires might extend along the conduits H differently—as, for instance, one wire may extend around all the faces of a number of blocks.

In Fig. 2 I have shown a block, 5, provided with a station or office, Q, where are located dynamo-electric machines R and S, for a street-lamp, and for lamps in the houses and other buildings of that block. Here a wire, $d$, extends from the dynamo-electric machine R through the conduit H of all faces of the block. The said wire, therefore, passes entirely around the block and back to the said dynamo-electric machine. A wire, $e$, passes from the dynamo-electric machine S, along the conduit H of that face of the block 5 which is on street C, to an electric street-lamp, L, and back in the same way to said dynamo-electric machine, or else to the ground. All the other blocks, 1, 2, 3, 4, 6, 7, 8, and 9, may be supplied by electricity in the same way from a similar central station on each block. In this modification of my invention I obviate the necessity of extending wires across the streets. Preferably the stations or offices of the blocks will be furnished with extra dynamo-electric machines, as before.

The conduits H (shown in Figs. 3 and 4) are of segmental form, provided with flat backs bearing against the outer face of curbs $f$, made of stone or other suitable material, and of the usual form. These conduits are shown as having flanges along their top and bottom edges for the reception of screw-bolts or other devices, $g$, whereby the conduits may be secured to the curb. The conduits may be made of cast-iron or other suitable material, and may be composed of sections fitted together with joints, which, by the aid of cement, or otherwise, shall be water-tight. This form of the conduits described is advantageous, as it affords a good bearing on the curb and projects but little beyond the curb, and hence is not liable to be in the way of vehicles, or to obstruct the gutter $h$. The convex front or outer side affords strength, and hence is desirable. The conduits may be secured by straps or bands to the curb, instead of by the flanges.

In Fig. 5 I have shown a conduit of circular form partly inserted in the face of the curb, so as to project but little. It is shown as secured to the curb by straps or bands $i$, overlapping it and fastened to the curb by bolts or other devices, $g$. This conduit will also be made in sections secured together so as to be water-tight. If desirable, a conduit may be entirely inserted in the face of the curb.

H' designates branch conduits extending from the conduits H through the curb and under the sidewalk, one to the cellar or basement of each of the houses adjacent to which the conduits H extend. They may be screwed into or otherwise secured to the conduits H, so as to have a water-tight connection therewith. The wires passing through these conduits and branch conduits are insulated from the conduits and from each other. Wires for conveying electricity for other purposes than lighting may pass through the conduits H—as, for instance, telegraph or telephone wires. All the wires may be comprised in a cable, if desirable. The wire for conducting electricity to the houses and other buildings on a block extends through each of the branch conduits H' and back again to the main conduit, thus forming a loop at each house or building. Where the tenants of a house or building do not desire electricity the wire merely extends to the end of the branch conduit H' and back, and a cap, H², is secured to the inner end of the branch conduit, over the wire, as shown in Fig. 4, and on the branch conduit, which is uppermost, in Fig. 3. Thus tampering with the wire will be prevented, and the wire will be protected. When, however, the tenants of a house desire electricity the cap H² will be taken off the branch conduit and the wire will have its ends disconnected and connected with the ends of a wire running through the house. A tenant desiring electricity may thus have the necessary connections made very expeditiously.

It will thus be seen that I provide a very convenient means for conveying wires for electrical apparatus, which will be cheap, effective, and accessible, and which will not be in the way or unsightly.

What I claim as my invention, and desire to secure by Letters Patent, is—

1. The combination, with a sidewalk-curb, of wires or electrical conductors and a conduit receiving the wires or electrical conductors and affixed to the face of the curb, substantially as specified.

2. The combination, with a sidewalk-curb, of wires or electrical conductors, and a conduit receiving the wires or conductors affixed to the face of the curb, and having a flat back bearing on the curb and a convex front, substantially as specified.

3. The combination, with a sidewalk-curb, of wires or electrical conductors, a conduit receiving the wires or conductors and affixed to or in the face of the curb, and branch conduits extending through the curb and under the sidewalk to houses or other buildings, substantially as specified.

4. The combination, with a sidewalk-curb, of wires or electrical conductors, the conduits H, branch conduits H′, and caps H², substantially as specified.

C. A. HUSSEY.

Witnesses:
EDWIN H. BROWN,
T. J. KEANE.